J. W. L. LETHERBURY.
TREE BOX.
No. 82,234.  Patented Sept. 15, 1868.
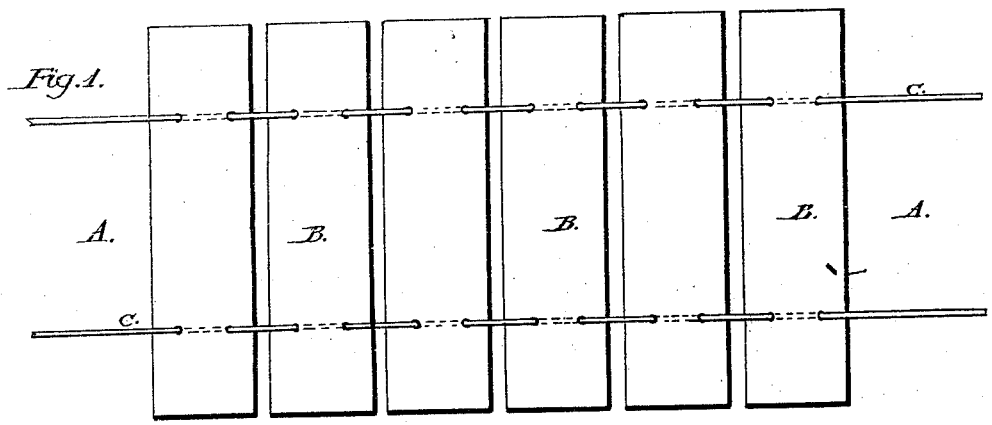
Fig. 1.
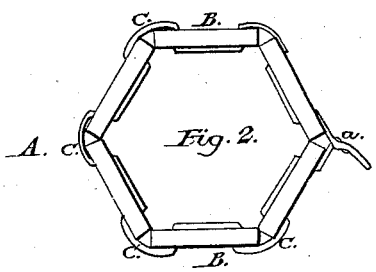
Fig. 2.
Fig. 3.
WITNESSES:
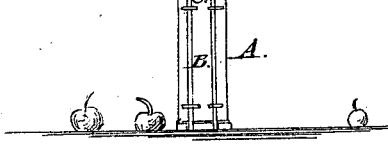
INVENTOR:

United States Patent Office.

JOHN W. L. LETHERBURY, OF SANDOVAL, ILLINOIS.

Letters Patent No. 82,234, dated September 15, 1868.

IMPROVEMENT IN TREE-BOXES.

*The Schedule referred to in these Letters Patent and making part of the same.*

TO ALL WHOM IT MAY CONCERN:

Be it known that I, JOHN W. L. LETHERBURY, of Sandoval, in the county of Marion, and State of Illinois, have invented a new and useful Tree-Wrapper; and I do hereby declare the following to be a clear and exact description of the nature thereof, sufficient to enable others skilled in the art to which my invention appertains to fully understand and use the same, reference being had to the accompanying drawings, making part of this specification, in which—

Figure 1 is an elevation of the parts of my wrapper in an extended position.

Figure 2 is a top view of the same in a folded position.

Figure 3 shows the application thereof to a tree.

Similar letters of reference indicate corresponding parts in the several figures.

My invention is a novel device for protecting the trunks of trees, and consists of a series of slats united together in such a manner as to form a folding frame, which may be enlarged or diminished according to the size of the trees, and is adapted to encircle their trunks, and thereby protect them from destructive animals, wheels of vehicles, and other injurious causes, as will be hereinafter more fully described.

In the drawings—

A represents my wrapper, consisting of a series of vertical slats B, of wood or other suitable material, and of length or height equal to the trunk of the tree intended to be protected.

These slats are arranged parallel to each other, and united by one or more wires or cords C, which are passed through perforations or openings in the slats, so as to connect them together, and thus form a folding slatted frame, or a series of hinged slats, which are adapted to encircle the trunk of a tree, as seen in fig. 3.

The wires or cords C should be sufficiently long so as to meet when the frame is folded, and afford means for securing and retaining it around the tree.

The cords or wires are passed in and out of each slat so as to interlace each other, and thereby hinge them together, as well as to allow the ready removal or attachment of the slats.

As there is but little strain of the slats on each other, the means of fastening the ends of the frame are merely by looping, knotting, tying, or twisting, as seen at a, fig. 2.

In carrying out my invention, I select as many slats as are necessary relative to the thickness of the trunk of the tree, and the wires or cords are run through slats as stated.

The trunk is now encircled with the wrapper as thus prepared, and the ends of the cords or wires united, and the invention is complete. The frame rests by its end on the ground, and may be suitably protected by metal caps or bases, to prevent premature rotting or decay of the wood.

The means for connecting the slats may be varied. Perforations may be made through the width of the slats, and the wires or cords run through them, or the latter may be united to the slats by eyes or staples, or the slats may be hinged together by ordinary hinges or pieces of leather that will allow the folding or bending of the frame so as to lap or encircle the tree.

It will be noticed that when the tree grows and increases in size, additional slats may be applied, or if the wrapper is to be removed from a smaller tree to a larger one, or *vice versa*, the increase or diminution of the number of slats is all that is necessary to adjust the wrapper to the thickness of the tree.

My invention is equally applicable to orchard and other trees that are liable to be barked by rabbits, mice, and other destructive animals, as well as to shade-trees in cities, and in places exposed to horses, vehicles, and pedestrians, and for every purpose in which it is necessary or desirable to protect the trunk of a tree against injury, whether providential, accidental, or intentional.

Having thus described my invention, what I claim as new, and desire to secure by Letters Patent, is—

A tree-wrapper, constructed and operating substantially as described.

To the above, I have signed my name, this 13th day of July, 1868.

JOHN W. L. LETHERBURY.

Witnesses:
HARRY F. SHERMAN,
ALEX. PTOMEY.